(12) United States Patent
Potts et al.

(10) Patent No.: US 9,103,320 B1
(45) Date of Patent: Aug. 11, 2015

(54) ENERGY RECOVERY COOLING UNIT

(71) Applicants: Ryan Potts, Castaic, CA (US); Chris Garant, Castaic, CA (US)

(72) Inventors: Ryan Potts, Castaic, CA (US); Chris Garant, Castaic, CA (US)

(*) Notice: Subject to any disclaimer, the term of this patent is extended or adjusted under 35 U.S.C. 154(b) by 153 days.

(21) Appl. No.: 13/968,199

(22) Filed: Aug. 15, 2013

(51) Int. Cl.
*F03D 9/00* (2006.01)

(52) U.S. Cl.
CPC .............. *F03D 9/002* (2013.01); *F03D 9/003* (2013.01)

(58) Field of Classification Search
CPC .............. F24F 1/20; F24F 1/22; F24F 1/56; F24F 13/20
USPC ........ 290/55, 44, 1 R, 43, 54; 415/2.1, 4.1, 7, 415/4.3, 4.5; 60/398; 439/928
See application file for complete search history.

(56) References Cited

U.S. PATENT DOCUMENTS

| | | | |
|---|---|---|---|
| 5,645,434 A * | 7/1997 | Leung | 439/74 |
| 6,365,985 B1 | 4/2002 | Cohen | |
| 7,112,893 B1 * | 9/2006 | Villanueva | 290/55 |
| 7,208,846 B2 | 4/2007 | Liang | |
| 7,240,503 B2 | 7/2007 | Kang et al. | |
| 7,404,299 B2 | 7/2008 | Drysdale et al. | |
| 7,999,407 B2 | 8/2011 | Saluccio | |
| 8,183,709 B1 * | 5/2012 | Manning | 290/55 |
| 8,278,777 B2 | 10/2012 | Buns | |
| 8,545,259 B2 * | 10/2013 | Matthias et al. | 439/500 |
| 2003/0201646 A1 * | 10/2003 | Kaploun | 290/54 |
| 2008/0292479 A1 * | 11/2008 | Lin et al. | 417/423.7 |
| 2009/0026767 A1 * | 1/2009 | Petrounevitch | 290/53 |
| 2009/0146425 A1 * | 6/2009 | Widisky | 290/44 |
| 2009/0246015 A1 * | 10/2009 | Hsu | 415/213.1 |
| 2010/0244455 A1 * | 9/2010 | Berginc | 290/55 |
| 2011/0316282 A1 * | 12/2011 | Holstein et al. | 290/54 |
| 2012/0112465 A1 * | 5/2012 | Morrison | 290/55 |

FOREIGN PATENT DOCUMENTS

| | | |
|---|---|---|
| CN | 2470724 | 1/2002 |
| CN | 201652720 | 11/2010 |

* cited by examiner

*Primary Examiner* — Julio Gonzalez
*Assistant Examiner* — Sean Gugger
(74) *Attorney, Agent, or Firm* — Michael I. Kroll

(57) ABSTRACT

A renewable energy power generation system for a cooling unit which comprises a housing sized to fit the cooling unit. The housing has an upper aperture and a lower aperture positioned over an exhaust port of the cooling unit. A rotor mounted wind turbine is in the housing between the upper aperture and the lower aperture. A venting flow coming through the exhaust port of the cooling unit will travel past the lower aperture of the housing to operate the wind turbine and then pass out of the upper aperture of the housing to cause the wind turbine to generate electricity.

3 Claims, 8 Drawing Sheets

ENERGY RECOVERY COOLING UNIT

BACKGROUND OF THE INVENTION

Field of the Invention

The present invention relates generally to cooling units and, more specifically, to a cooling unit having a power generating module comprising an alternator/generator having a fan in fluid communication with the cooling units exhaust flow for the purpose of harnessing additional typically wasted energy from the cooling unit fan.

The present invention generates electrical power through the rotation of the alternator/generator fan using the cooling unit's exhaust as the motive force for said alternator/generator to generate power that can be fed back into the device's electrical supply.

While there are other air conditioning units suitable for the purposes for which they were designed, they would not be as suitable for the purposes of the present invention, as hereinafter described.

SUMMARY OF THE PRESENT INVENTION

A primary object of the present invention is to provide a more efficiently operating cooling unit through the addition of a power generating module.

Another object of the present invention is to provide a cooling unit with an alternator/generator to gather wasted energy from the exhaust air flow in a typical refrigeration fan cycle.

Yet another object of the present invention is to provide a cooling unit wherein said alternator/generator has a fan blade in fluid communication with a cooling unit's exhaust flow.

Still yet another object of the present invention is to provide a cooling unit with an inverter to change DC into AC current.

An additional object of the present invention is to provide a cooling unit wherein said inverter is a grid-tie inverter for synchronizing the generated current with the grid current.

A further object of the present invention is to provide a power generating module wherein said alternator/generator is a one, two or three phase motor.

A yet further object of the present invention is to provide a cooling unit that has reduced power loads for its continued operation.

A still yet further object of the present invention is to provide a system for retrofitting an existing cooling unit with a power generating unit that uses the fan's rotating motion to increase its efficiency.

Additional objects of the present invention will appear as the description proceeds.

The present invention overcomes the shortcomings of the prior art by providing an increased efficiency cooling unit utilizing an alternator/generator mechanically fitted to a fan whereby the rotative motion of the driveshaft is converted to electrical power to effectively harness waste mechanical energy, and convert it back into electrical energy, to be fed back to the electrical load supplying the unit. Additionally this system may be retrofitted to existing units to increase the efficiency of grandfathered systems.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the renewable energy power generation system of the present invention. With regard to the reference numerals used, the following numbering is used throughout the various drawing figures.
10 cooling unit
12 air conditioner for cooling unit 10
14 venting flow from cooling unit 10
16 exhaust port of cooling unit 10
18 renewable energy power generation system
20 alternator/generator of system 18
22 turbine fan of system 18
24 grid-tie inverter of system 18
26 housing of system 18
28 auxiliary electrical unit
30 grid-tie inverter of unit 28

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
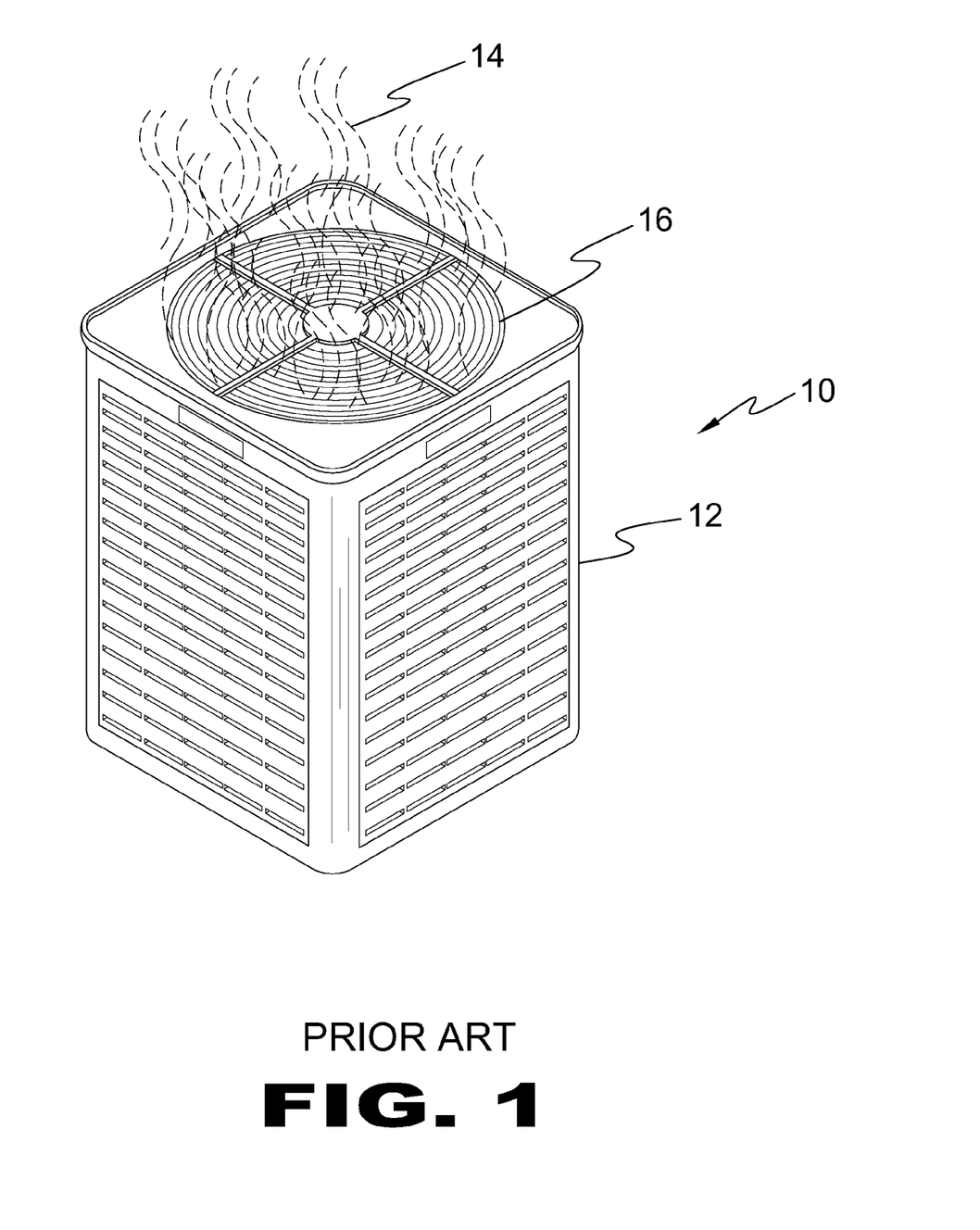
Referring to FIG. 1, shown is an illustrative view of prior art.

Referring to FIG. 1 is an illustrative view of prior art. A cooling unit 10 such as an air conditioner 12, a hood vent system and the like will produce a waste energy venting flow 14 through an exhaust port 16 that potentially can be used as renewable energy. The present invention provides a renewable energy power generation system 18 that recovers the waste energy venting flow 14 from the cooling unit 10.

Figure 2:
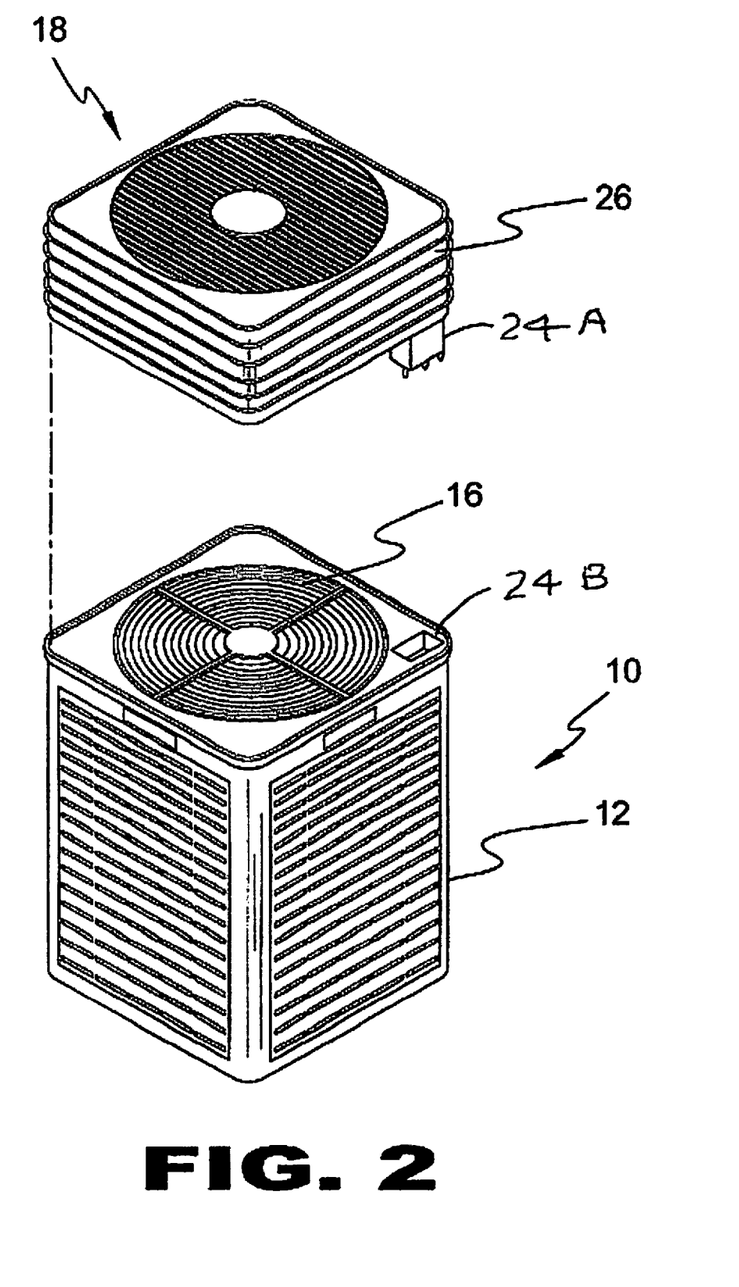
Referring to FIG. 2, shown is a perspective view of the present invention.

Referring to FIG. 2 is a perspective view of the present invention. Shown is the renewable energy electric power generation system 18 of the present invention that will return the renewable energy directly back into the cooling unit 10, to an energy collection system or back directly into the electrical wiring of an auxiliary device.

Also shown in FIG. 2 is plug 26A mounted on a lower corner portion of housing 26, and socket 26B mounted within an upper corner portion of cooling unit 12 and wired to a power input component within the cooling unit 12, whereby when housing 26 is properly positioned over the exhaust port of the cooling unit 12 plug 26A will fit into socket 26B.

Figure 3:
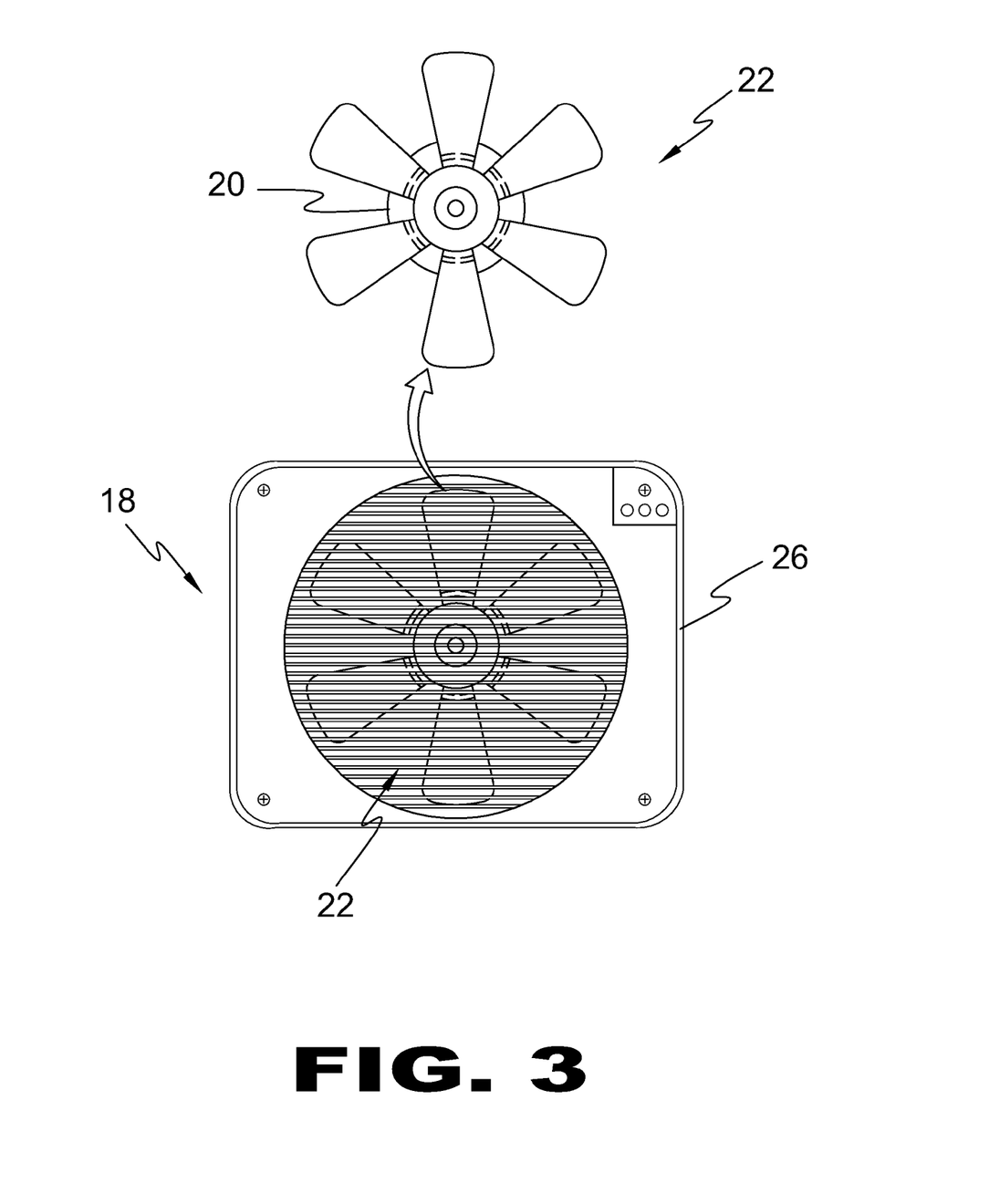
Referring to FIG. 3, shown is an orthographic view of the present invention.

Referring to FIG. 3 is an orthographic view of the present invention. Shown is the renewable energy electric power generation system 18 comprising an alternator/generator 20 that collects the energy from the movement of the venting flow 14, wind, exhaust or discharge from the cooling unit 10 to create electric energy, when the cooling unit 10 is in operation, through the alternator/generator 20 having a rotor mounted turbine fan 22 using the venting flow 14, as motive force to drive the alternator/generator 20. Further provided is a grid-tie inverter 24, whereby DC current can be synchronized back into the AC grid.

Figure 4:
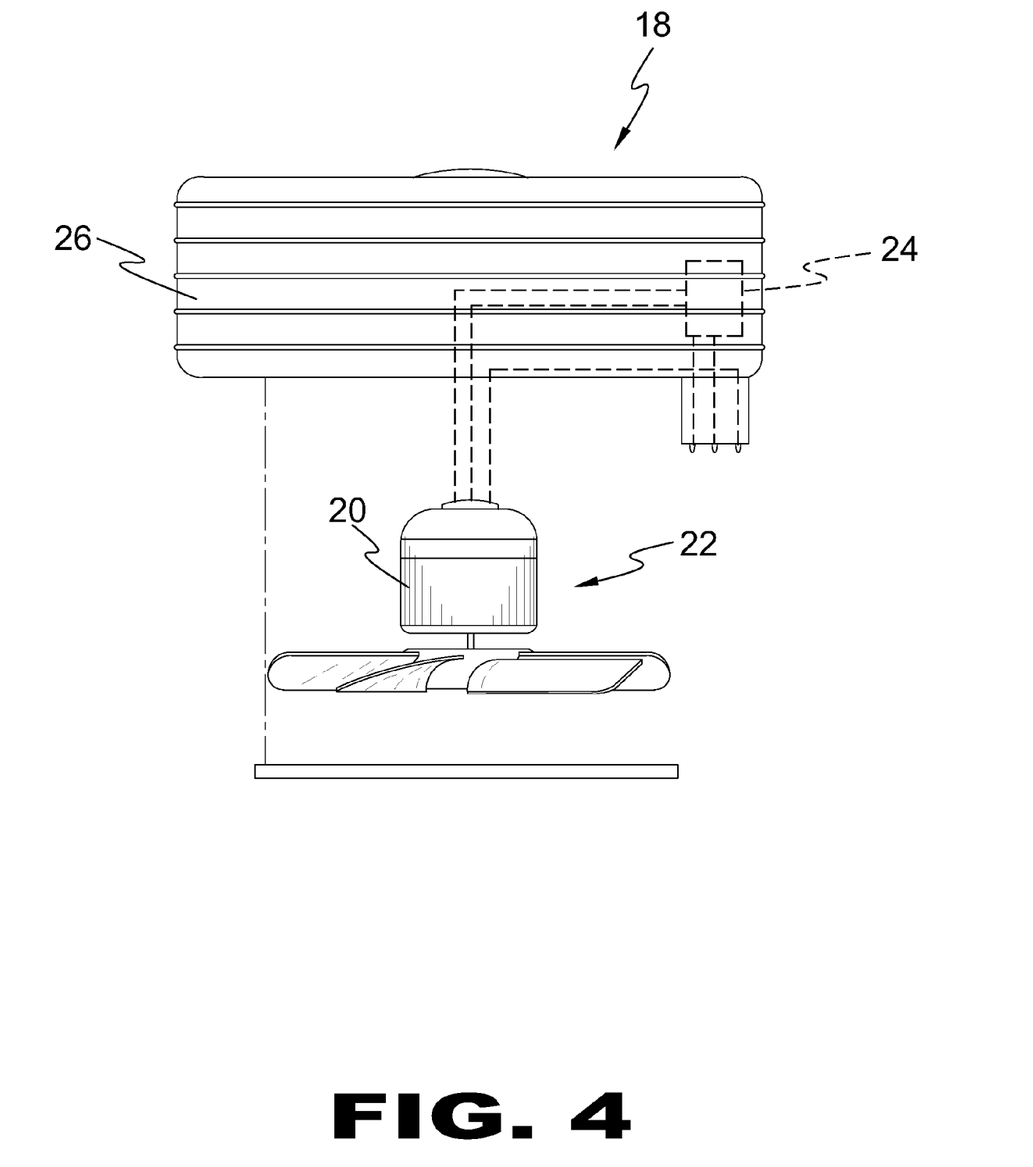
Referring to FIG. 4, shown is an orthographic view of the present invention.

Referring to FIG. 4 is an orthographic view of the present invention. Shown is the renewable energy electric power generation system 18 comprising the alternator/generator 20 to collect rotational movement from the turbine fan 22 which collects the energy from the movement of the venting flow 14, wind, exhaust or discharge by the cooling unit 10 to create continuous electric energy when the cooling unit 10 is in operation.

Figure 5:
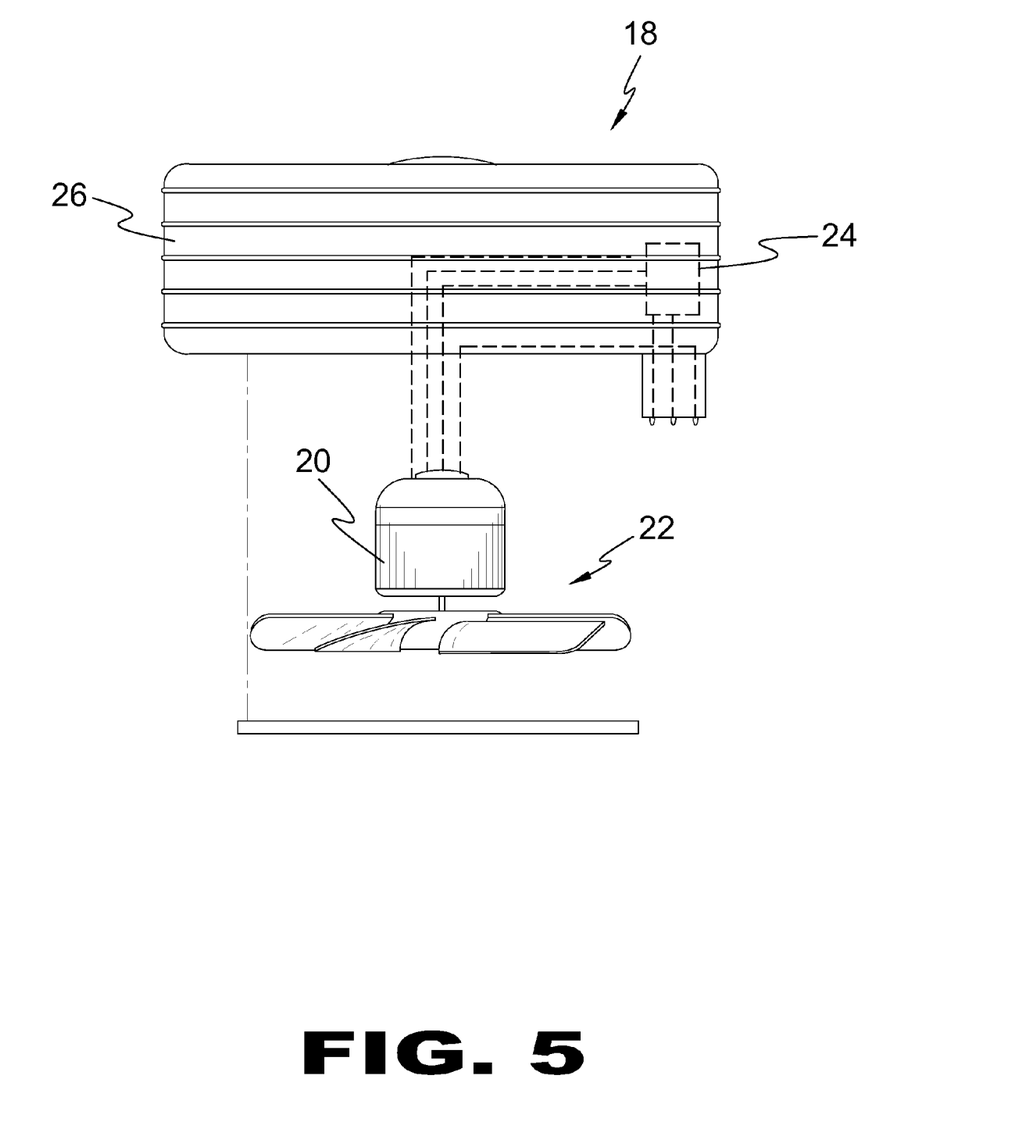
Referring to FIG. 5 is an orthographic view of the present invention.

Referring to FIG. 5 is an orthographic view of the present invention. Shown is the renewable energy electric power generation system 18 comprising the alternator/generator 20 to collect rotational movement from the turbine fan 22 which collects the energy from the movement of the venting flow 14, wind, exhaust or discharge by the cooling unit 10 to create continuous electric energy when the cooling unit 10 is in operation.

Figure 6:
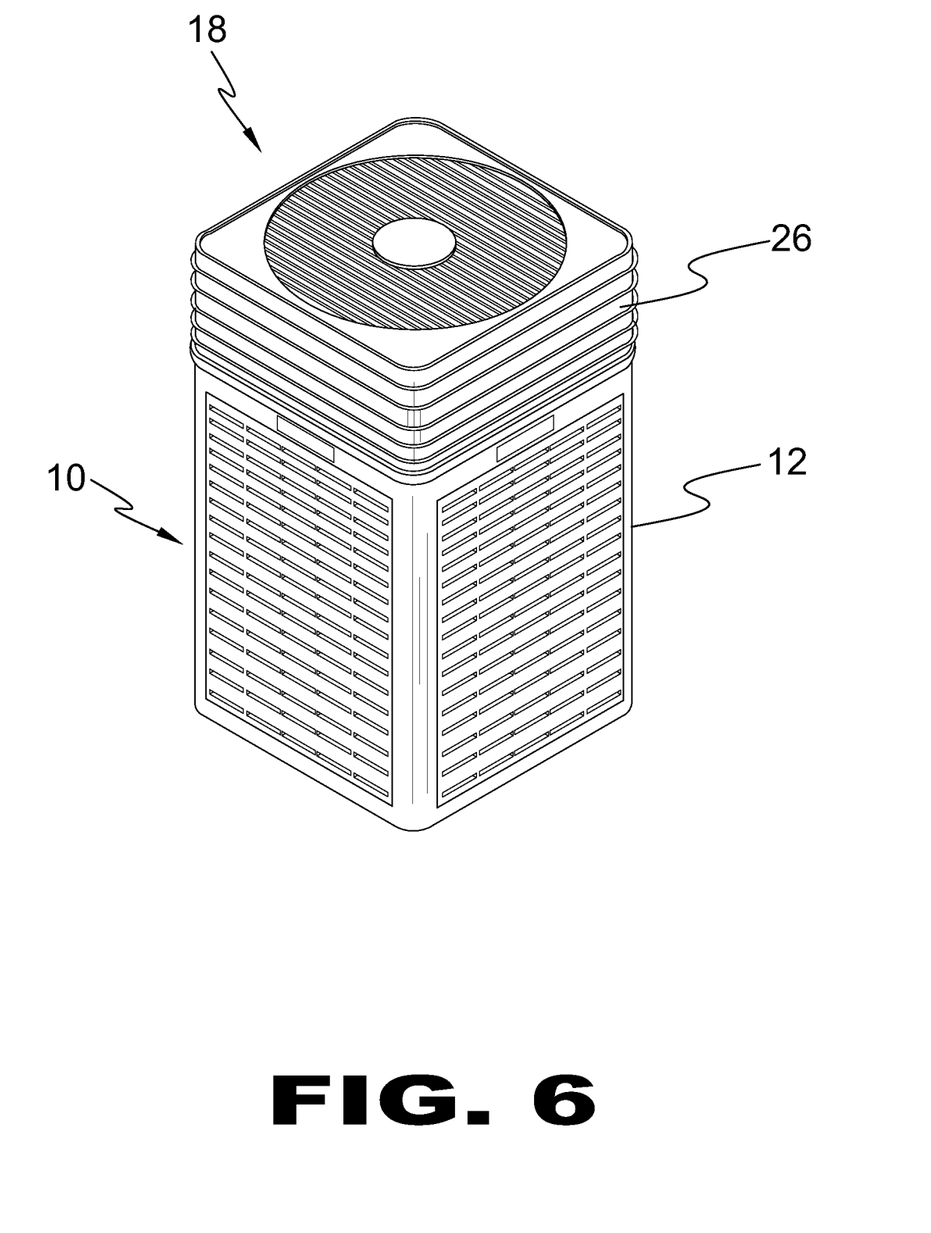
Referring to FIG. 6, shown is a perspective view of the present invention.

Referring to FIG. 6 is a perspective view of the present invention. Shown is the renewable energy electric power generation system 18 comprising the alternator/generator 22 in a housing 26 that is assembled on top of the cooling unit 10 to collect the discharge of energy output from the venting flow 14.

Figure 7:
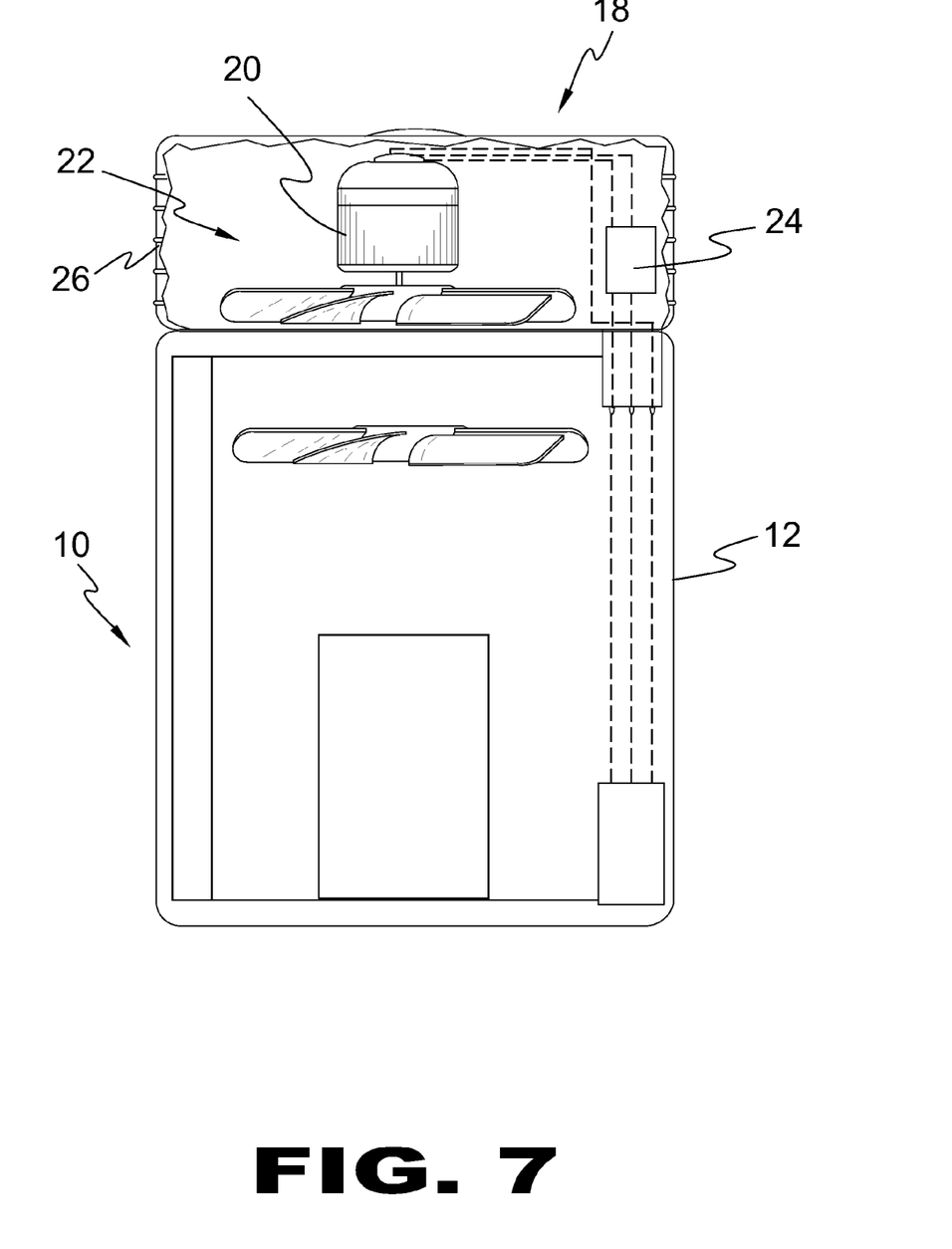
Referring to FIG. 7, shown is a sectional view of the present invention.

Referring to FIG. 7 is a sectional view of the present invention. Shown is the renewable energy electric power generation system 18 comprising the alternator/generator 22 assembled in the housing 26 on top of the cooling unit 10 to generate electricity from the cooling unit's venting flow 14.

Figure 8:
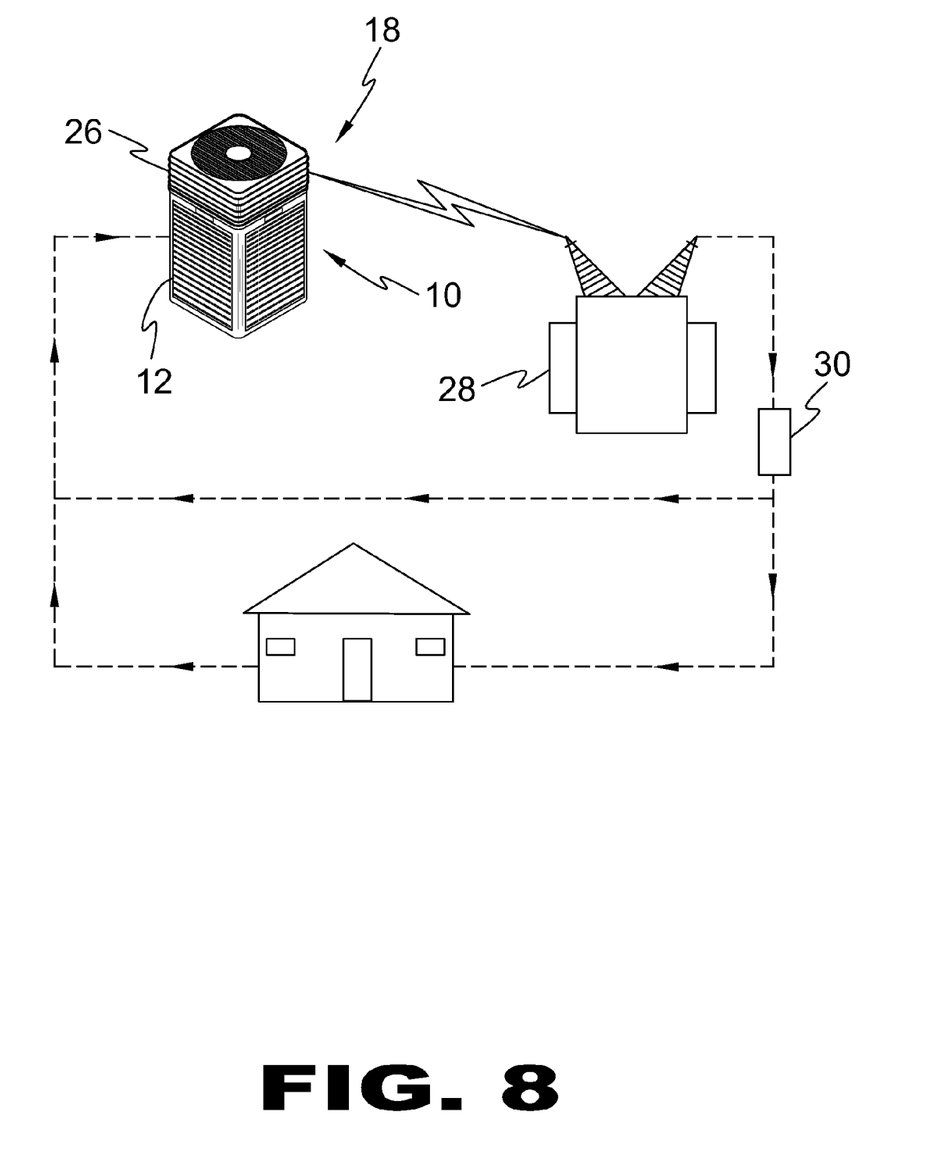
Referring to FIG. 8, shown is an illustrative view of the present invention.

Referring to FIG. 8 is an illustrative view of the present invention. Shown is the renewable energy electric power generation system 18 having the capability of returning energy back to the cooling unit 10, or an auxiliary electrical unit 28 being a cooling unit having a fan mounted to an alternator/generator with a grid-tie inverter 30 synchronizing the generated power back into the source grid.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A renewable energy power generation system for a cooling unit which comprises:
    a) a housing matingly engageable to the cooling unit, the housing having an upper aperture and a lower aperture positioned over an exhaust port of the cooling unit; and
    b) a rotor mounted wind turbine in the housing between the upper aperture and the lower aperture, whereby a venting flow coming through the exhaust port of the cooling unit will travel past the lower aperture of the housing to operate the wind turbine and then pass out of the upper aperture of the housing to cause the wind turbine to generate electricity;
    c) said wind turbine comprising an alternator/generator hard wired to the cooling unit, a shaft rotatably extending downwardly from the alternator/generator, and a propeller with a plurality of fan blades mounted on the distal end of the shaft;
    d) an inverter electrically connected to the alternator/generator to change DC current into AC current, said inverter being a grid/tie inverter for synchronizing the generated current with a grid current; and
    e) a plug mounted on a bottom surface and adjacent a lower corner portion of the housing and wired to the alternator/generator and the inverter, and a socket mounted in an upper surface and adjacent a corner portion of the cooling unit to receive said plug and wired to a power input component within the cooling unit, whereby when the housing is properly positioned over the exhaust port of the cooling unit the plug will fit into the socket.

2. The system as recited in claim 1, whereby each of the apertures in the housing is covered by a screen above and below the wind turbine.

3. The system as recited in claim 1, wherein the alternator/generator is selected from the group of one, two or three phase motors.

\* \* \* \* \*